United States Patent
Nakamura et al.

(10) Patent No.: US 9,546,239 B2
(45) Date of Patent: Jan. 17, 2017

(54) LATEX FOR MOLDING USE, COMPOSITION FOR DIP MOLDING USE, AND DIP-MOLDED ARTICLE

(71) Applicant: ZEON CORPORATION, Tokyo (JP)

(72) Inventors: Yoshiyuki Nakamura, Tokyo (JP); Osamu Ishizu, Tokyo (JP); Shunjin Aihara, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 14/768,675

(22) PCT Filed: Feb. 20, 2014

(86) PCT No.: PCT/JP2014/054041
§ 371 (c)(1),
(2) Date: Aug. 18, 2015

(87) PCT Pub. No.: WO2014/129547
PCT Pub. Date: Aug. 28, 2014

(65) Prior Publication Data
US 2015/0376322 A1    Dec. 31, 2015

(30) Foreign Application Priority Data

Feb. 22, 2013  (JP) .................................. 2013-033233
Sep. 27, 2013  (JP) .................................. 2013-201829

(51) Int. Cl.
| | |
|---|---|
| C08K 5/42 | (2006.01) |
| C08F 279/02 | (2006.01) |
| C08K 5/41 | (2006.01) |
| C08L 51/04 | (2006.01) |
| C08K 5/47 | (2006.01) |
| C08K 5/09 | (2006.01) |

(52) U.S. Cl.
CPC ............. *C08F 279/02* (2013.01); *C08K 5/41* (2013.01); *C08K 5/42* (2013.01); *C08K 5/47* (2013.01); *C08L 51/04* (2013.01); *C08K 5/09* (2013.01)

(58) Field of Classification Search
CPC .................................. C08F 279/02; C08K 5/47
USPC ........................................................ 524/158
See application file for complete search history.

(56) References Cited

U.S. PATENT DOCUMENTS

2002/0111431 A1*  8/2002  Kajiwara ................ C08L 13/02
                                                           525/162
2003/0032724 A1    2/2003  Noda et al.

FOREIGN PATENT DOCUMENTS

| | | |
|---|---|---|
| JP | 2001-261751 A | 9/2001 |
| JP | 2001-526923 A | 12/2001 |
| JP | 2002-053602 A | 2/2002 |
| JP | 2002-241412 A | 8/2002 |
| JP | 2009-209229 A | 9/2009 |
| WO | 2010/098008 A1 | 9/2010 |
| WO | 2013/099501 A1 | 7/2013 |

OTHER PUBLICATIONS

May 20, 2014 Search Report issued in International Patent Application No. PCT/JP2014/054041.

* cited by examiner

*Primary Examiner* — Hui Chin
(74) *Attorney, Agent, or Firm* — Oliff PLC

(57) ABSTRACT

Provided is a carboxy-modified synthetic isoprene polymer latex for dip molding use, which is produced by the graft polymerization of a synthetic isoprene polymer with a monomer having a carboxyl group in an aqueous phase and contains at least one anionic surfactant, wherein a carboxy-modified synthetic isoprene polymer that constitutes the carboxy-modified synthetic isoprene polymer latex has a tetrahydrofuran-insoluble content of 30 wt % or more.

11 Claims, No Drawings

LATEX FOR MOLDING USE, COMPOSITION FOR DIP MOLDING USE, AND DIP-MOLDED ARTICLE

TECHNICAL FIELD

The present invention relates to a carboxyl-modified synthetic isoprene polymer latex for dip molding, a composition for the dip molding, and a dip molded article.

BACKGROUND ART

Conventionally, it is known that dip molded article which is to be used by contacting the human body such as a nipple, a balloon, gloves, balloon and a sack or so can be obtained by dip molding the composition for a dip molding which comprises latex of natural rubber (Patent document 1). However, latex of natural rubber comprises proteins which causes an allergy reaction to human body, thus it was difficult to use as the dip molded article which directly contacts with the biological mucosa or organs without carrying out a deproteinization treatment. Therefore, as the gloves used for the surgery, the gloves made of synthetic isoprene polymer has been considered, however the gloves made of synthetic isoprene polymer has poor tear strength compared to that made of natural rubber. As the gloves used for the surgery, it is required not to break during the medical treatment in order to protect the doctors from the infection, thus the gloves made of the synthetic isoprene polymer is demanded to have a tear strength equal or stronger than the natural rubber.

PRIOR ART DOCUMENT

Patent document 1 JP Patent Application Laid Open No. 2001-526923

SUMMARY OF THE INVENTION

Technical Problems to be Solved by the Invention

The object of the present invention is to provide the latex for the dip molding which can give the dip molded article having excellent tensile strength. Also, the object of the present invention is to provide the composition for the dip molding and the dip molded article obtained by using this latex.

Means for Solving the Problems

The present inventors have found that the above objects can be attained by using the latex of carboxyl-modified synthetic isoprene polymer obtained by graft polymerizing the monomer comprising the carboxyl group on to the synthetic isoprene polymer in the aqueous phase (hereinafter, it will be referred as "the carboxyl-modified isoprene polymer latex), which comprises specific surfactant, and the latex having specific amount or more of the tetrahydrofuran insoluble content of the carboxyl-modified isoprene polymer.

That is, according to the present invention, a carboxyl-modified synthetic isoprene polymer latex for dip molding obtained by graft polymerizing the monomer comprising the carboxyl group on to the synthetic isoprene polymer in an aqueous phase, wherein the carboxyl-modified synthetic isoprene polymer latex comprises at least one anionic surfactant, and a carboxyl-modified synthetic polymer composing the carboxyl-modified synthetic isoprene latex has a tetrahydrofuran-insoluble content of 30 wt % or more is provided.

Further, the above mentioned anionic surfactant comprises a fatty acid salt and, at least one selected from the group consisting of alkyl benzene sulfonate, alkyl sulfosuccinate, alkyl sulfate and polyoxyethylenealkylether sulfate.

Also, the total content of said anionic surfactant is preferably 5 parts by weight or less with respect to 100 parts by weight of said carboxyl-modified synthetic isoprene polymer.

Further, the tetrahydrofuran insoluble content of said carboxyl-modified synthetic isoprene polymer is preferably 60 wt % or more.

Further, said carboxyl-modified synthetic isoprene polymer latex preferably comprises 0.1 to 100 weight ppm of alcohol.

Also, according to the present invention, a carboxyl-modified synthetic isoprene polymer latex for dip molding, wherein said carboxyl-modified synthetic isoprene polymer latex comprises at least one anionic surfactant, a carboxyl-modified synthetic polymer composing the carboxyl-modified synthetic isoprene polymer latex have a tetrahydrofuran-insoluble content of 30 wt % or more, and a swelling degree in tetrahydrofuran of 30 times or less is provided.

Further, according to the present invention, the composition for the dip molding comprising the sulfur based vulcanizing agent and a vulcanization accelerator, and the dip molded article formed by dip molding said composition for the dip molding are provided.

Note that, the tear strength measured by ASTM D624-00 (Die C, 500 mm/min) is preferably 30 N/mm or more.

Also, the above mentioned dip molded is preferably gloves.

Effects of the Present Invention

According to the present invention, the latex for the dip molding which can provide the dip molded article having excellent tensile strength, the composition for the dip molding obtained by said latex, and the dip molded article made by molding the composition for the dip molding can be provided.

EMBODIMENTS FOR CARRYING OUT THE INVENTION

The latex of the present invention is a carboxyl-modified synthetic isoprene polymer latex for dip molding obtained by graft polymerizing the monomer comprising the carboxyl group on to the synthetic isoprene polymer in an aqueous phase, wherein the carboxyl-modified synthetic isoprene polymer latex comprises at least one anionic surfactant, and a carboxyl-modified synthetic isoprene composing the carboxyl-modified synthetic isoprene latex has a tetrahydrofuran-insoluble content of 30 wt % or more.

Synthetic Isoprene Polymer

The synthetic isoprene polymer used in the present invention is the synthetic isoprene polymer obtained by polymerizing the isoprene.

The synthetic isoprene polymer may be made by copolymerizing the isoprene and copolymerizable other ethylenic unsaturated monomer. The content of the isoprene unit of the synthetic isoprene polymer is preferably 70 wt % or more, more preferably 90 wt % or more, further preferably 95 wt % or more and particularly preferably 100 wt % (homopolymer of isoprene) with respect to the entire monomer unit, since the dip molded article which is flexible and having excellent tensile strength can be obtained easily.

As for other ethylenic unsaturated monomer copolymerizable with isoprene, for example, a conjugated diene monomer other than isoprene such as butadiene, chloroprene, 1,3-pentadiene or so; ethylenic unsaturated nitrile monomer such as acrylonitrile, methacrylonitrile, fumaronitrile, α-chloroacrylonitrile or so; vinyl aromatic group monomer such as styrene, alkylstyrene or so; ethylenic unsaturated carboxylic acid ester monomer such as methyl (meth)acrylate, ethyl (meth)acrylate, butyl (meth)acrylate, 2-ethylhexyl (meth)acrylate or so may be mentioned. These ethylenic unsaturated monomers capable of copolymerizing with isoprene may be used alone or by combining two or more. Note that, in the present specification, (meth)acrylic refers to acrylic and methacrylic both.

The synthetic isoprene polymer can be obtained by solution polymerizing the isoprene in the inactive polymerization solvent by using t such as Ziegler polymerization catalyst formed of trialkylaluminum-titanium tetrachloride, alkyl lithium polymerization catalyst, n-butyllithium, and sec-butyllithium or so. Then, the polymer solution of the synthetic isoprene solution obtained as such may be used for the synthetic isoprene polymer latex, but also it may be used for the production of the synthetic isoprene polymer latex by taking out the solid synthetic isoprene polymer from said polymer solution and then dissolving said solid synthetic isoprene polymer in the organic solvent.

At this time, the impurities such as the residues of the polymerization catalyst remained in the polymer solution after the synthesis can be removed. Further, antioxidant which will be described in below may be added to the solution of after the polymerization or during the polymerization. Also, the commercially available solid synthetic isoprene polymer may be used for the production of the synthetic isoprene polymer latex.

As for the isoprene unit in the synthetic isoprene polymer, there are 4 types depending on the form of the bonding which are cis-bonding unit, trans-bonding unit, 1,2-vinyl bonding unit and 3,4-vinyl bonding unit.

From the point of improving the tensile strength of the dip molded article, the content ratio of the cis-bonding unit in the isoprene unit included in the synthetic isoprene polymer is preferably 70 wt % or more, more preferably 90 wt % or more, and particularly preferably 95 wt % or more with respect to entire isoprene unit.

The weight average molecular weight of the synthetic isoprene polymer is 10,000 to 5,000,000, preferably 500,000 to 5,000,000, and particularly preferably 800,000 to 3,000,000 in terms of standard polystyrene conversion by a gel permeation chromatography analysis. If the weight average molecular weight of the synthetic isoprene polymer is too small, the tensile strength of the dip molded article tends to decline, and on the other hand, if it is too large, the latex of the synthetic isoprene polymer tends to become difficult to produce.

Also, a polymer Mooney viscosity [$ML_{1+4}$, 100° C.] of the synthetic isoprene polymer is preferably 50 to 80, more preferably 60 to 80, and particularly preferably 70 to 80.

In the present invention, as the monomer comprising the carboxyl group is graft polymerized on to the synthetic isoprene polymer in the aqueous phase, the latex of the synthetic isoprene polymer is used.

In the present invention, as for the production method of the synthetic isoprene polymer latex, for example, (1) the method of producing the synthetic isoprene polymer latex by emulsifying in the water the solution or the fine suspension of the synthetic isoprene polymer being dissolved or finely dispersed to the organic solvent under the presence of the anionic surfactant, then removing the organic solvent depending on the needs; and (2) the method of carrying out the emulsion polymerization or suspension polymerization of isoprene alone or the mixture of the isoprene and the ethylenic unsaturated monomer copolymerizable with isoprene under the presence of the anionic surfactant, thereby directly producing the synthetic isoprene polymer or so may be mentioned. However, the above mentioned production method (1) is preferable since the synthetic isoprene polymer having high ratio of cis-bond unit in the isoprene unit can be obtained, and also the dip molded article having excellent tensile strength tends to be easily obtained.

As for the organic solvent used in the above mentioned production method (1), aromatic hydrocarbon solvents such as benzene, toluene, xylene or so; alicyclic hydrocarbon solvents such as cyclopentane, cyclopentene, cyclohexane, cyclohexene or so; aliphatic hydrocarbon solvents such as pentane, hexane, heptane or so; halogenated hydrocarbon solvents such as methylene chloride, chloroform, ethylene dichloride or so may be mentioned. Among these, alicyclic hydrocarbon solvents are preferable, and cyclohexane is particularly preferable.

Note that, the used amount of the organic solvent is preferably 2,000 parts by weight or less, more preferably 20 to 1,500 parts by weight with respect to 100 parts by weight of synthetic isoprene polymer.

In the above mentioned production method (1), at least one anionic surfactant is used. As the anionic surfactant, fatty acid salts such as sodium laurate, potassium myristate, sodium palmitate, potassium oleate, sodium linolenate, sodium rosinate or so; alkylbenzene sulfonate such as sodium dodecylbenzene sulfonate, potassium dodecylbenzene sulfonate, sodium decylbenzene sulfonate, potassium decylbenzene sulfonate, sodium cetylbenzene sulfonate, potassium cetylbenzene sulfonate or so; alkyl sulfosuccinates such as sodium di(2-ethylhexyl)sulfosuccinate, potassium di(2-ethylhexyl)sulfosuccinate, sodium dioctylsulfosuccinate or so; alkyl sulfates such as sodium lauryl sulfate, potassium lauryl sulfate or so; polyoxyethylene alkyl sulfates such as sodium polyoxyethylenelaurylether sulfate, potassium polyoxyethylenelaurylether sulfate or so; monoalkylphosphates such as sodium lauryl phosphate, potassium lauryl phosphate or so may be mentioned.

Among these, as the effects of the present invention becomes more prominent, fatty acid salts, alkyl benzene sulfonates, alkylsulfosuccinates, alkylsulfates and polyoxyethylenealkylether sulfates are preferable, and fatty acid salts and alkyl benzene sulfonates are particularly preferable.

Also, since the polymerization catalyst (particularly, aluminum and titanium), which remains in a small amount, derived from the synthetic isoprene polymer can be efficiently removed, and the aggregation product during the composition for the dip molding can be suppressed; thus it is preferable to together use a fatty acid and at least one selected from the group consisting of alkyl benzene sulfonates, alkyl sulfosuccinates, alkyl sulfates and polyoxyethylenealkyl ether sulfates, and particularly preferably alkylbenzene sulfonates and the fatty acids as both used. Here, as the fatty acids, sodium rosinate and potassium rosinate are preferable; and also as the alkyl benzene sulfonates, sodium dodecyl benzene sulfonate and potassium dodecyl benzene sulfonate are preferable. Also, these surfactants may be used alone or by combining two or more thereof.

Note that, as mentioned in the above, by using both the fatty acids, and at least one selected from the group consisting of alkyl benzene sulfonates, alkyl sulfosuccinates, alkyl sulfates and polyoxyethylenealkyl ether sulfates, the obtained carboxyl-modified synthetic isoprene polymer latex for dip molding comprises the fatty acids and at least one selected from the group consisting of alkyl benzene sulfonates, alkyl sulfosuccinates, alkyl sulfates and polyoxyethylenealkyl ether sulfates.

Also, as for the surfactants other than the anionic surfactants which can be used for the above mentioned production method (1), the copolymerizable surfactants such as sulfoesters of $\alpha,\beta$-unsaturated carboxylic acid, sulfate esters of $\alpha,\beta$-unsaturated carboxylic acid and sulfoalkylarylethers or so may be mentioned.

Further, as long as it is within the range which does not interfere the coagulation by the coagulant which is used during the dip molding, a non-ionic surfactant may be used together such as polyoxyethylene alkyl ether, polyoxyethylenealkylphenol ether, polyoxyethylenealkylester, polyoxyethylene sorbitan alkylester or so.

The used amount of the anionic surfactant used in the above mentioned production method (1) is preferably 0.5 to 50 parts by weight, more preferably 0.5 to 40 parts by weight, further preferably 5 to 30 parts by weight with respect to 100 parts by weight of synthetic isoprene polymer. Note that, in case of using two or more of the surfactants, the total used amount of these is preferably within the above mentioned range. That is, for example, in case of both using the fatty acids, and at least one selected from the consisting of alkyl benzene sulfonates, alkyl sulfosuccinates, alkyl sulfates and polyoxyethylenealkyl ether sulfates, then the total of the used amount of these is preferably within the above mentioned range. If the used amount of the anionic surfactants is too small, then there is a risk that the aggregation product may be produced in a large amount during emulsifying, and on the other hand, if it is too much, it becomes easy to form foam and the pin holes may be generated in the dip molded article.

Also, in case of both using the fatty acids, and at least one selected from the group consisting of alkyl benzene sulfonates, alkyl sulfosuccinates, alkyl sulfates and polyoxyethylenealkyl ether sulfates as the anionic surfactant, the used ratio of these, that is the weight ratio of "the fatty acid":"at least one selected from the group consisting of alkyl benzene sulfonates, alkyl sulfosuccinates, alkyl sulfates and polyoxyethylenealkyl ether sulfates" is preferably within 1:1 to 10:1, more preferably 1:1 to 7:1. If the used ratio of the surfactant of at least one selected from the group consisting of alkyl benzene sulfonates, alkyl sulfosuccinates, alkyl sulfates and polyoxyethylenealkyl ether sulfates is too much, then the foaming may become too much during the handling of the synthetic isoprene polymer, as a result it may be necessary to leave it still for a long period of time, or the procedure to add the defoaming agent may become necessary, which will cause the deterioration of the workability and the increase of the cost. On the other hand, if the used ratio of the surfactant of at least one selected from the group consisting of alkyl benzene sulfonates, alkyl sulfosuccinates, alkyl sulfates and polyoxyethylenealkyl ethersulfates is too little, a large amount of the aggregation product tends to be produced when adding the monomer comprising the carboxyl group during the graft polymerization of the monomer comprising the carboxyl group.

In the present invention, a large amount of anionic surfactant is used during the emulsification as mentioned in above, and after the emulsification, it is preferable to reduce the total content of the anionic surfactant by the method such as centrifugation method or so. The total content of the anionic surfactant in the synthetic isoprene polymer latex during the graft polymerization is preferably 5 parts by weight or less, more preferably 3 parts by weight or less, particularly preferably 0.1 to 3 parts by weight with respect to 100 parts by weight of the synthetic isoprene polymer.

The amount of the water used in the above mentioned production method (1) is preferably 50 to 5000 parts by weight, more preferably 500 to 4000 parts by weight with respect to 100 parts by weight of the synthetic isoprene polymer. As the type of the water used, hard water, a soft water, ion exchange water, distilled water and zeolite water or so may be mentioned, and a soft water, ion exchange water, and distilled water are preferable.

The device for emulsifying the solution or the fine suspension of the synthetic isoprene polymer dissolved or dispersed to the organic solvent in the water under the presence of the anionic surfactant, can be used without particular limitation as long as it is those commercially available in general as emulsifying device or the disperser. Further, the adding method of the anionic surfactant is not particularly limited, and it may be added in advance to the water and/or the solution or the fine suspension of the synthetic isoprene polymer, or it may be added to the emulsion liquid while carrying out the emulsifying procedure, and it may be added at once or it may be added by dividing it.

As the emulsifying device, for example, a batch type emulsifying device such as the product name "Disperser" (made by IKA), the product name "POLYTRON" (made by Kinematica) and the product name "TK-HOMOGENIZING MIXER" (made by PRIMIX Corporation) or so; a continuous emulsifying device such as the product name "TK-pipeline homomixer" (made by PRIMIX Corporation), the product name "Colloide mill" (made by Kobelco Ecosolutions Co., LTD), the product name "Slusher" (made by NIPPON COKE & ENGINEERING CO., LTD), the product name "Trigonal wet-type fine grinding mill" (made by NIPPON COKE & ENGINEERING CO., LTD), the product name "CAVITRON" (made by EUROTEC. CO., LTD), the product name "MILDER" (made by Pacific Machinery & Engineering Co., Ltd), the product name "Fine flow mill" (made by Pacific Machinery & Engineering Co., Ltd); a high pressure emulsifying device such as the product name "Microfluidizer" (made by MIZUHO INDUSTRIAL CO., LTD), the product name "Nanomizer" (made by NANOMIZER Inc), the product name "APV Gaulin" (made by Gaulin Co., Ltd); a membrane emulsifying device such as the product name "Membrane emulsifying device" (made by REICA Co., Ltd); the product name "VIBROMIXER" (made by REICA Co., Ltd); an ultrasonic emulsifying device such as the product name "ultrasonic homogenizer" (made by Branson Ultrasonics, Emerson Japan, Ltd) or so may be mentioned. Note that, the condition of the emulsifying procedure by the emulsifying device is not particularly limited and it can appropriately set the treatment temperature and the temperature time or so, so that the desired dispersed condition can be obtained.

In the above mentioned production method (1), the organic solvent is preferably removed from the emulsified product after the emulsifying procedure.

As the method for removing the organic solvent from the emulsified product, preferably the content of the organic solvent (preferably the alicyclic hydrocarbon solvent) in the obtained synthetic isoprene polymer latex is 500 weight ppm or less; and the vacuum distillation, atmospheric distillation, steam distillation and centrifugation or so can be employed.

Carboxyl-Modified Synthetic Isoprene Polymer

The carboxyl-modified synthetic isoprene polymer composing the carboxyl-modified synthetic isoprene polymer latex for dip molding of the present invention can be obtained by graft polymerizing the monomer comprising the carboxyl group on to the above mentioned synthetic polymer in aqueous phase.

The tetrahydrofuran-insoluble content of the carboxyl-modified synthetic isoprene polymer needs to be 30 wt % or more, and preferably 60 wt % or more. If the tetrahydrofuran-insoluble content is too small, the tensile strength of the dip molded article declines.

Also, the swelling degree in the tetrahydrofuran of the carboxyl-modified synthetic isoprene polymer is preferably 30 times or less, and particularly preferably 20 times or less. If the swelling degree in the tetrahydrofuran is too large, then the tensile strength and the tear strength tend to decline.

Note that, the carboxyl-modified synthetic isoprene polymer latex is poured to the glass board with a frame, and the water is removed by leaving still for long period of time to obtained the film, then this film was immersed in the tetrahydrofuran for predetermined time, thereby the swelling degree in the tetrahydrofuran can be, obtained from the ratio of the weight of before and after the immersion.

Also, the method for making the swelling degree in the tetrahydrofuran of the carboxyl-modified synthetic isoprene polymer to 30 times or less is not particularly limited, and for example, the monomer comprising the carboxyl group may be preferably 1 to 100 parts by weight, more preferably 2 to 50 parts by weight is used with respect to 100 parts by weight of the synthetic isoprene polymer during the graft polymerization of the carboxyl group which will be described in below, thereby the graft polymerization conversion rate may be made to 95 wt % or more.

As the method for making the tetrahydrofuran-insoluble content of the carboxyl-modified synthetic isoprene polymer to 30 wt % or more, it is not particularly limited, and for example, (A) the method of adding and crosslinking the redox catalyst which is the combination of the organic peroxides and reducing agent, to the synthetic isoprene polymer latex obtained by the above mentioned production method (1); or (B) the method of adding the crosslinkable monomer such as divinylbenzene, diethyleneglycoldi(meth) acrylate, pentaerythritol(meth)acrylate or so to the synthetic isoprene polymer latex obtained by the above mentioned production method (1), then graft polymerizing the crosslinkable monomer by a conventional method or so may be mentioned. However, the above mentioned method (A) is preferable since the graft polymerization of the monomer comprising the carboxyl group which will be described in below can be carried out simultaneously.

As the organic peroxides, for example diisopropylbenzenehydroperoxide, cumenehydroperoxide, t-butylhydroperoxide, 1,1,3,3,-tetramethylbutylhydroperoxide, di-t-butylperoxide, isobutyrylperoxide, benzoylperoxide or so may be mentioned; however 1,1,3,3,-tetramethylbutylhydroperoxide is preferable from the point of improving the mechanical strength of the obtained dip molded article. These organic peroxides may be used alone or it may be used by combining two or more thereof.

The used amount of the organic peroxides is not particularly limited, however preferably it is 0.01 to 3 parts by weight, more preferably 0.1 to 1 parts by weight with respect to 100 parts by weight of the synthetic isoprene polymer.

As the reducing agent, for example, the compounds comprising the metal ion which is in a reduced state such as iron (I) sulfate, copper (I) naphthenate or so; sulfonic acid compounds such as sodium methane sulfonate or so; amine compounds such as dimethylaniline or so may be mentioned. These reducing agents may be used alone or by combining two or more thereof.

The used amount of the reducing agent is not particularly limited, however it is preferably 0.01 to 1 parts by weight with respect to 1 parts by weight of the organic peroxide.

In case of carrying out the crosslinking of the synthetic isoprene polymer at the same time with the graft polymerization of the monomer comprising the carboxyl group, using the redox catalyst which combines the organic peroxides and the reducing agent, the conventionally known graft polymerization can be used. Also, as the addition method, the known addition method such as adding the organic peroxides and the reducing agent at one time, or by dividing it, or by adding continuously or so can be employed.

As the reaction temperature, in case of carrying out the graft polymerization using the redox catalyst, it is preferably 5 to 70° C., and more preferably 10 to 70° C.

As the preferable specific examples, the monomer comprising the carboxyl group, and the redox catalyst which combines the organic peroxides and the reducing agent, is graft polymerized on to the synthetic isoprene polymer latex which has removed the organic solvent from the emulsified product in the aqueous phase; and also carrying out the crosslinking of the synthetic isoprene polymer simultaneously; thereby the tetrahydrofuran-insoluble content of the carboxyl-modified synthetic isoprene polymer is controlled.

At this time, the solid concentration of the synthetic isoprene polymer latex is not particularly limited, however preferably it is 5 to 40 wt %, and more preferably 5 to 30 wt %. If this solid concentration is too low, the graft rate declines, and if it is too high the aggregation product tends to form.

As the monomer comprising the carboxyl group, for example, an ethylenic unsaturated monocarboxylic acid monomers such as acrylic acid, methacrylic acid or so; an ethylenic unsaturated polyvalent carboxylic acid monomers such as itaconic acid, maleic acid, fumaric acid, butane tricarboxylic acid or so; a partial ester monomers of ethylenic unsaturated polyvalent carboxylic acid such as monobutyl fumarate, monobutyl maleate, mono-2-hydroxyl propyl maleate or so; a polyvalent carboxylic acid anhydride such as maleic anhydride, citraconic anhydride or so may be mentioned, however since the effect of the present invention becomes further prominent, the ethylenic unsaturated monocarboxylic acid monomer is preferable, and acrylic acid and methacrylic acid are particularly preferable. Note that, these monomers can be used alone, or by combining two or more thereof.

Also, the above mentioned carboxyl group includes a salt between the alkali metal or ammonia or so.

The used amount of the monomer comprising the carboxyl group is preferably 0.01 parts by weight to 100 parts by weight, more preferably 0.01 parts by weight to 40 parts by weight, and further preferably 0.5 to 20 parts by weight with respect to 100 parts by weight of synthetic isoprene polymer. If the used amount of the monomer comprising the carboxyl group is too little, the tensile strength of the dip molded article tends to decline. On the other hand, if the used amount of the monomer comprising the carboxyl group is too large, the viscosity of the obtained carboxyl-modified synthetic isoprene polymer latex becomes too high, and in some case, it cannot be transported.

As the method for adding the monomer comprising the carboxyl group to the synthetic isoprene polymer latex, it is not particularly limited, and the method of adding at once, or by dividing it, or by adding continuously can be employed.

Note that, the control of the above mentioned tetrahydrofuran-insoluble content and the graft polymerization of the monomer comprising the carboxyl group can be carried out separately. In such case, as for the polymerization catalyst (the graft polymerization catalyst) of the graft polymerization, for example, inorganic peroxides such as sodium persulfate, potassium persulfate, ammonium persulfate, potassium perphosphate, hydrogen peroxide or so; organic peroxides such as diisopropylbenzenehydroperoxide, cumenehydroperoxide, t-butylhydroperoxide, 1,1,3,3,-tetramethylbutylhydroperoxide, di-t-butylperoxide, isobutyrylperoxide, bezoylperoxide or so; azo compounds such as 2,2'-azobisisobutylonitrile, azobis-2,4-dimethylvaleronitrile, methyl azobisisolactate or so may be mentioned. However, from the point of improving the mechanical strength of the obtained dip molded article, the organic peroxides are preferable, and 1,1,3,3,-tetramethylbutylhydroperoxide is particularly preferable.

The above mentioned graft polymerization catalyst can be used alone, or by combining two or more thereof. The used amount of the graft polymerization catalyst is preferably 0.1 to 10 parts by weight, more preferably 0.2 to 5 parts by weight with respect to 100 parts by weight of synthetic isoprene polymer. Also, the method of adding the graft polymerization catalyst is not particularly limited, and the method of adding at once, or by dividing it, or by adding continuously can be employed.

Note that, the graft polymerization conversion rate is preferably 95 wt % or more, and particularly preferably 97 wt % or more. If the graft polymerization conversion rate is too low, the tensile strength and the tear strength tend to decline.

In the carboxyl-modified synthetic isoprene polymer latex obtained as such, the additives such as a pH modifier, a defoaming agent, a preservative, a chelate agent, an oxygen scavenger, a disperser, an antioxidant or so may be blended which are usually blended in the field of latex.

As for the pH modifier, for example, hydroxides of alkali metals such as sodium hydroxide, potassium hydroxide or so; carbonates of alkali metals such as sodium carbonate, potassium carbonate or so; hydrogen carbonates of the alkali metals such as sodium hydrogen carbonate or so; ammonia; and organic amine compounds such as trimethyl amine, triethanol amine or so may be mentioned; however hydroxides of alkali metals or ammonia are preferable.

Also, after the graft polymerization, depending on the needs, in order to increase the solid concentration of the carboxyl-modified synthetic isoprene polymer latex, the condensation procedure may be carried out by the method of the vacuum distillation, the atmospheric distillation, the centrifugation, and a membrane condensation or so. However, from the point that the remaining amount of the anionic surfactant in the carboxyl-modified synthetic isoprene polymer latex can be controlled, the centrifugation is preferable.

In case the carboxyl-modified synthetic isoprene polymer latex of after the graft polymerization is placed in the centrifuge, in order to improve the mechanical stability of the latex, the pH modifier is added in advance, and the pH of the latex is preferably set to 7 or higher, and further preferably to 9 or higher. As the pH modifier, hydroxides of alkali metals such as sodium hydroxide, potassium hydroxide or so, or ammonia are preferable.

Note that, when the pH of the latex is regulated, the carboxyl group being introduced by the modification may be in a state of salt.

When the continuous centrifuge is used, the centrifugal force is set to 4,000 to 5,000 G, the solid concentration of the carboxyl-modified synthetic isoprene polymer latex before centrifugation is set to preferably of 2 to 15 wt %, the flow speed of the introducing into the centrifuge is set preferably to 500 to 2000 Kg/hr, and the back pressure (the gauge pressure) of the centrifuge is preferably set to 0.03 to 1.6 MPa; thereby the centrifugation is preferably carried out.

The solid concentration of the carboxyl-modified synthetic isoprene polymer latex of the present invention is preferably 30 to 70 wt %, more preferably 40 to 70 wt %. If the solid concentration is too low, the polymer particles stored in the latex may separate, and on the other hand if it is too high, the polymer particles may aggregate and form large aggregation product.

The volume average particle diameter of the carboxyl-modified synthetic isoprene polymer latex of the present invention is 0.5 to 10 µm, preferably 0.5 to 3 µm, and more preferably 0.5 to 2 µm. If this volume average particle diameter is too small, the latex viscosity may become too high and the handling may become difficult, on the other hand, if it is too large, the coating may be formed on the latex surface when storing the latex.

Also, the total content of the anionic surfactant of the carboxyl-modified synthetic isoprene polymer latex of the present invention is preferably 5 parts by weight or less, more preferably 3 parts by weight or less, and particularly preferably 0.1 to 3 parts by weight with respect to 100 parts by weight of the carboxyl-modified synthetic isoprene polymer. In case the total content of the anionic surfactant is within the above range, the foaming is suppressed, and excellent tensile strength is obtained, thus the dip molded article without the pinhole can be easily obtained.

The amount of the carboxyl group (including those in a form of salt) in the carboxyl-modified synthetic isoprene polymer composing the carboxyl-modified synthetic isoprene polymer latex of the present invention is shown by the surface acid amount (meq/g) per 1 g of the polymer obtained from the conductometric titration, and preferably it is 0.05 to 2.0 meq/g, more preferably 0.05 to 1.5 meq/g, and particularly preferably 0.05 to 1.0 meq/g. If the surface acid amount is too small (the amount of the carboxyl group in the polymer is too little), the effect of improving the tensile strength of the dip molded article tends to become difficult to obtain. If the surface acid amount is too large (the amount of the carboxyl group in the polymer is too large), the viscosity of the latex becomes too high, and in some case it may be difficult to transport by pumps or so.

Note that, the measurement of the surface acid amount (meq/g) by the conductometric titration may be measured by the same method of "the acid amount measurement of the surface and the aqueous phase" as described in JP Patent Application Laid Open No. 2002-53602.

The content ratio of the monomer unit comprising the carboxyl group in the carboxyl-modified synthetic isoprene polymer is preferably 0.01 to 50 wt %, more preferably 0.5 to 40 wt %, further preferably 1 to 30 wt %, and particularly preferably 1 to 15 wt % with respect to entire monomer unit. If the content ratio of the monomer unit comprising the carboxyl group in the carboxyl-modified synthetic isoprene polymer is too large, in some case the dip molded article such as gloves or so may become too hard. If it is too small, the mechanical stability of the latex of the carboxyl-modified synthetic isoprene polymer declines, and the effect of improving the tensile strength and the tear strength of the obtained dip molded article tends to become difficult to obtain.

When producing the carboxyl-modified synthetic isoprene polymer latex of the present invention, as mentioned in above, in order to control the tetrahydrofuran-insoluble content, the method of crosslinking by adding the redox catalyst which combines the organic peroxides and the reducing agent is preferable.

However, in case of using the organic peroxides, depending on the used amount thereof, it may generate a smell which is derived from alcohol as the decomposition product of the organic peroxides. Therefore, the carboxyl-modified synthetic isoprene polymer latex of the present invention comprise 0.1 to 100 weight ppm, more preferably 1 to 50 weight ppm and particularly preferably 5 to 40 weight ppm of alcohol.

If the content of the alcohol is too much, the smell may become too strong.

Further, if the organic peroxides is not used at all or used only in a small amount in order to reduce the content of the alcohol, then the mechanical strength of the dip molded article tends to decline.

Also, in case the organic peroxides is used, the alcohol which is the decomposition product of the organic peroxides usually has a large molecular weight, and high boiling point; thus in order to significantly reduce the content of alcohol, a large-scale facility will be needed.

As the specific examples of alcohol which is the decomposition of the organic peroxides, the alcohol having the molecular weight of 60 or more, and the molecular weight of 100 or more such as 1-methyl-1-[4-(1-methylethyl)phenyl]ethanol, 1-methyl-1-phenylethanol, t-butylalcohol, 1,1,3,3-tetramethyl-1-butanol or so is preferable; and from the point of improving the mechanical strength of the dip molded article, 1,1,3,3-tetramethyl-1-butanol (the decomposition product of 1,1,3,3-tetramethylbutylhydroperoxide) is particularly preferable.

Note that, the molecular weight of the alcohol, which is the decomposition product of the organic peroxides, is preferably 300 or less, and particularly preferably 250 or less.

Also, the boiling point of the alcohol which is the decomposition product of the organic peroxides is preferably 100° C. or higher, and particularly preferably 100 to 200° C.

The method for making the content of the alcohol in the carboxyl-modified synthetic isoprene polymer latex of the present invention is not particularly limited, however deodorizing step (alcohol removing step) is preferably carried out after treating the carboxyl-modified synthetic isoprene polymer latex of after the graft polymerization by the centrifuge (the alcohol content increases due to the "condensation").

The treatment by the centrifuge can be carried out as same as the condition of the centrifugation of the above mentioned.

Also, the deodorizing step (the alcohol removing step) is preferably carried out by first diluting the carboxyl-modified synthetic isoprene polymer latex having the solid concentration of 30 to 70 wt % with water of 1 to 3 times more (based on the weight) of the latex, then carrying out the vacuum distillation by setting the temperature condition to 30 to 100° C., and the vacuum pressure of −0.027 to −0.101 MPa (the gauge pressure) to carry out the condensation.

Note that, depending on the case, the deodorizing step (the alcohol removing step) is carried out to the carboxyl-modified synthetic isoprene polymer latex of after the graft polymerization, and then it may be treated with the centrifuge.

The Composition for the Dip Molding

The composition for the dip molding of the present invention comprises a sulfur based vulcanizing agent and a vulcanization accelerator in addition to the above mentioned carboxyl-modified synthetic isoprene polymer latex.

As for the sulfur based vulcanizing agent, for example, sulfurs such as sulfur powder, flowers of sulfur, precipitated sulfur, colloidal flower, surface treated sulfur, insoluble sulfur or so; sulfur containing compounds such as sulfur chloride, sulfur dichloride, morpholine-disulfide, alkylphenol-disulfide, N,N'-dithio-bis(hexahydro-2H-azepinone-2), phosphorus containing polysulfide, polysulfide polymer, 2-(4'-morpholinodithio)benzothianol or so may be mentioned. Among these, sulfur is preferably used. These sulfur based vulcanizing agent can be used alone or by combining two or more thereof.

The used amount of the sulfur based vulcanizing agent is preferably 0.1 to 10 parts by weight, more preferably 0.2 to 3 parts by weight with respect to 100 parts by weight of the carboxyl-modified synthetic isoprene polymer. When this amount is within this range, the tensile strength of the dip molded article is even more improved.

As the vulcanization accelerator, those usually used for the dip molding can be used, for example, dithiocabamic acids such as diethyl dithiocarbamate, dibutyl dithiocarbamate, di-2-ethylhexyl dithiocarbamate, dicyclohexyl dithiocarbamate, diphenyl dithiocarbamate, dibenzyl dithiocarbamate or so and the zinc salts thereof; 2-mercatobenzo thiazole, zinc 2-mercaptobenzothiazole, 2-mercaptothiazoline, dibenzothiazyl-disulfide, 2-(2,4-dinitrophenylthio)benzothiazole, 2-(N,N-diethylthio-carbaylthio)benzothiazole, 2-(2,6-dimethyl-4-morpholinothio)benzothiazole, 2-(4'-morpholino-dithio)benzothiazole, 4-morpholinyl-2-benzothiazyl-disulfide, 1,3-bis(2-benzothiazyl-mercaptomethyl)urea or so may be mentioned. However, zinc diethyl dithiocarbamate, 2-mercaptobenzothiazole, zinc 2-mercaptobenzothiazole is preferable. These vulcanization accelerators may be used alone, or by combining two or more thereof.

The used amount of the vulcanization accelerators is preferably 0.05 to 5 parts by weight and more preferably 0.1 to 2 parts by weight with respect to 100 parts by weight of the carboxyl-modified synthetic isoprene polymer. If this amount is too little, the tensile strength of the dip molded article may decline in some case. Also, if it is too much, the stretch and the tensile strength of the dip molded article may decline in some case.

The composition for the dip molded article of the present invention preferably further comprises zinc oxide.

The content of the zinc oxide is not particularly limited, however preferably it is 0.1 to 5 parts by weight and more preferably 0.2 to 2 parts by weight with respect to 100 parts by weight of the carboxyl-modified synthetic isoprene polymer. If this amount is too little, the tensile strength of the dip molded article may decline in some case; and on the other hand, if it too much, the stability of the carboxyl-modified synthetic isoprene polymer particles in the composition for the dip molding declines and coarse aggregation product may be formed in some case.

In the composition for the dip molded article of the present invention, a disperser; an antioxidant; a reinforcing agent such as carbon black, silica and talc or so; a filler such as calcium carbonate, clay or so; an ultraviolet absorbing agent; a plasticizer or so may be blended as the blending agent depending on the needs.

As the antioxidant, for example, phenol based antioxidant which does not comprise sulfur atoms such as 2,6-di-4-methylphenol, 2,6-di-t-butylphenol, butyl hydroxyanisole, 2,6-di-t-butyl-α-dimethylamino-p-cresol, octadecyl-3-(3,5-di-t-butyl-4-hydroxyphenyl) propionate, styrenated phenol, 2,2'-methylene-bis(6-α-methyl-benzyl-p-cresol), 4,4'-methylenebis(2,6-di-t-butylphenol), 2,2'-methylene-bis(4-methyl-6-t-butylphenol), alkylated bisphenol, and butylated reaction product between p-cresol and dicyclopentadiene or so; thiobisphenol based antioxidants such as 2,2'-thiobis-(4-methyl-6-t-butylphenol), 4,4'-thiobis-(6-t-butyl-o-cresol), 2,6-di-t-butyl-4-(4,6-bis(octylthio)-1,3,5-triazine-2-ylamino)phenol or so; phosphite ester based antioxidants such as tris(nonylphenyl)phosphite, diphenylisodecylphosphite, tetraphenyldipropyleneglycol-diphosphite or so; sulfur ester based antioxidants such as dilauryl thiodipropionate or so; amine based antioxidants such as phenyl-α-naphthylamine, phenyl-β-naphtylamine, p-(p-toluenesulphonylaminde)-diphenylamine, 4,4'-(α,α-dimethylbenzyl)diphenylamine, N,N-diphenyl-p-phenylenediamine, N-isopropyl-N'-phenyl-p-phenylenediamine, butylaldehyde-aniline condensation product or so; quinolone based antioxidants such as 6-ethoxy-2,2,4-trimethyl-1,2-dihydroquinoline or so; hydroquinone based antioxidants such as 2,5-di-(t-amyl) hydroquinone or so may be mentioned. These antioxidants can be used alone or by combining two or more thereof.

The used amount of the antioxidant is preferably 0.05 to 10 parts by weight, more preferably 0.1 to 5 parts by weight with respect to 100 parts by weight of the carboxyl-modified synthetic isoprene polymer.

If this amount is too little, the carboxyl-modified synthetic isoprene polymer may deteriorate. Also, if this amount is too much, the tensile strength of the dip molded article may decline.

The preparation method of the composition for the dip molding is not particularly limited. As said preparation method, the method of mixing the sulfur based vulcanizing agent, the vulcanization accelerator, zinc oxide and dispersing agent which is added if needed and other blending agent such as antioxidant or so with the carboxyl-modified synthetic isoprene polymer latex using the disperser such as a ball mill, a kneader, a disperser or so; and the method of first preparing the aqueous dispersion of the desired blending components other than the carboxyl-modified synthetic isoprene polymer latex in advance using the above disperser, then mixing said aqueous dispersion with the carboxyl-modified synthetic isoprene polymer latex or so may be mentioned.

The pH of the composition for the dip molding is preferably 7 or more, and more preferably the pH is 8 to 12. Also, the solid concentration of the composition for the dip molding is preferably within the range of 15 to 65 wt %.

The composition for the dip molding of the present invention is preferably carried out with aging (also called as pre-vulcanization) before dip molding. The time for pre-vulcanization is not particularly limited, although it depends on the temperature of the pre-vulcanization, it is preferably 1 to 14 days, and further preferably it is 1 to 7 days. If this time is too short or too long, the tensile strength of the obtained dip molded article may decline in some case. Note that, the temperature of the pre-vulcanization is preferably 20 to 40° C.

Then, after the pre-vulcanization, it is preferably stored at the temperature of 10 to 30° C. If it is kept stored at a high temperature, the tensile strength of the obtained dip molded article may decline in some case.

The Dip Molded Article

The dip molded article of the present invention is obtained by dip molding the composition for the dip molding of the present invention. The dip molding is a method of immersing the composition for the dip molding to the mold to deposit said composition to the surface of the mold, then pulling out said composition from the mold, followed by drying said composition deposited on the surface of the mold. Note that, the mold of before the immersion to the composition for the dip molding may be heated in advance. Also, depending on the needs, the solidifier can be used before immersing the mold to the composition for the dip molding, or after pulling out the mold from the composition for the dip molding.

As the specific example of the method for using the solidifier, the method of immersing the mold, of before immersing in the composition for the dip molding, into the solution of solidifier to adhere the solidifier to the mold (an anode coagulation immersion method); the method of immersing the mold which has been deposited with the composition for the dip molding to the solidifier solution (a Teague coagulation immersion method) or so may be mentioned, however the anode coagulation immersion method is preferable from the point that the dip molded article with little thickness unevenness can be obtained.

As the specific examples of the solidifiers, for example aqueous polyvalent metal salts such as, halogenated metals such as barium chloride, calcium chloride, magnesium chloride, zinc chloride, aluminum chloride or so; nitrates such as barium nitrate, calcium nitrate, zinc nitrate or so; acetates such as barium acetate, calcium acetate, zinc acetate or so; sulfates such as calcium sulfate, magnesium sulfate, aluminum sulfate or so may be mentioned. Among these, calcium salts are preferable, and calcium nitrate is more preferable.

The aqueous polyvalent metal salts may be used alone, or by combining two or more thereof.

The solidifier is preferably used in an aqueous solution state. This aqueous solution may comprise aqueous organic solvent such as methanol, ethanol or so, or nonionic surfactants or so. The concentration of the solidifier may be different depending on the type of the aqueous polyvalent metal salts, however preferably it is 5 to 50 wt %, and more preferably 10 to 30 wt %.

The deposition formed on the mold is usually dried by applying the heat after the mold is pulled out from the composition for the dip molding. The drying condition may be selected appropriately.

Next, by applying the heat, the deposition formed on the mold is vulcanized.

The heating condition during the vulcanization is not particularly limited, however the heat applying temperature is preferably 60 to 150° C., and more preferably 100 to 130° C.; and the heat applying time is 10 to 120 minutes.

The method for applying the heat is not particularly limited; however the method of applying the heat by warm air in the oven, or the method of applying the heat by irradiating the infrared ray may be mentioned.

Also, in order to remove the aqueous impurity (for example, residues of the surfactant or the solidifiers), the mold is preferably washed by water or warm water, before or after applying the heat to the mold deposited with the composition for the dip molding. As the warm water used, preferably the temperature is 40 to 80° C., and more preferably 50 to 70° C.

The dip molded article after the vulcanization is released from the molded. As the specific example of the method for releasing, the method of peeling off by hand, or the method of peeling off by water pressure or the compressed air pressure or so may be mentioned. If the dip molded article in the middle of the vulcanization has sufficient strength for releasing, then it may be released in the middle of the vulcanization, and the vulcanization may be continued.

The dip molded article of the present invention has excellent tensile strength, thus it is preferably used for the groves. In case the dip molded article is the gloves, in order to prevent the dip molded article from adhering against each other at the contact face, and to enhance the smooth attachment and removal, the inorganic fine particles such as talc, calcium carbonate or so, or the organic fine particles such as starch particles or so may be sprayed on the surface of the gloves, or the elastomer layer comprising the fine particles may be formed on the surface of the gloves, or the surface of the glove can be chlorinated.

Note that, the molded article of the present invention preferably has excellent tear strength. That is, the tear strength of the present invention measured by ASTM D624-00 (Die C, 500 mm/min) is preferably 30 N/mm or more, and particularly preferably 40 N/mm or more.

Also, other than the above, the dip molded article of the present invention can be used for medical supplies such as nipples for nursing bottle, dropping pipette, tube, water pillow, balloon sacks, catheter, condoms or so; toys such as balloon, doll, ball or so; industrial supplies such as bags for pressure molding, bags for gas storage or so; finger stalls or so.

EXAMPLES

Hereinafter, the present invention will be described in further detail based on the examples; however the present invention is not to be limited thereto. Note that, hereinafter, "parts" is based on the weight unless mentioned otherwise. Note that, various physical properties were measured as described in below.

The Content of the Surfactant 0.15 g of the latex was scaled and 2 ml of hyperpure water was added, then by adding the acetonitrile, the solution was set to 10 ml. Next, 0.2 μm of the supernatant was filtered by disk filter, then it was measured using a reverse-phase high-performance liquid chromatography (HPLC).

Column: the product name "ZORBOX XDB-C18 1.8μ" (made by Agilent Technologies)
Column temperature: 40° C.
Flow speed: 0.75 ml/min
Detector: DAD (diode array detector)
Introduced amount: 2 μL The Conversion Rate of the Graft Polymerization Using the below described device and column, the gas chromatography analysis was carried out; thereby the amount of the unreacted methacrylic acid was first obtained. The amount of the reacted methacrylic acid was calculated by subtracting the unreacted methacrylic acid from the amount of the methacrylic acid used for the polymerization, then this was divided by the amount of the methacrylic acid used for the polymerization and expressed by percentage (unit: %).

Device: the product name "GC-4000" (made by GL Sciences Inc)
Capillary column: the product name "InterCap PureWax ProG2m 0.25×30 m df=0.25" (made by GL Sciences Inc)
Detector: FID Tetrahydrofuran-Insoluble Content 40 g of the latex wherein the solid concentration being regulated to 30% by the distilled water was poured to the glass plate (16 cm×23 cm) with the frame, then it was left for 5 days at 23° C. under the relative humidity of 50%, thereby the film having the thickness of 0.2 to 0.3 mm was obtained. This film was cut into the size having the length of 5 mm and the width of 5 mm to form a sample. The weight (A) of about 0.2 g of the sample was scaled, then this was immersed in 100 ml of tetrahydrofuran (made by Wako Pure Chemical Industries Ltd, $1^{st}$ Grade) while introduced in the basket made of stainless steel of 80 mesh, and it was taken out after 48 hours at 23° C. After leaving this for 1 hour or more in the room at 23° C., the heat was applied for 2 hours at 105° C., then the weight (B) of the insoluble amount at dried state was measured. The tetrahydrofuran-insoluble content was obtained from the below equation.

$$\text{Tetrahydrofuran-insoluble content} = (B/A) \times 100 \text{ (wt \%)}$$

The Swelling Degree in Tetrahydrofuran 40 g of the latex wherein the solid concentration being regulated to 30% by the distilled water was poured to the glass plate (16 cm×23 cm) with the frame, then it was left for 5 days at 23° C. under the relative humidity of 50%, thereby the film having the thickness of 0.2 to 0.3 mm was obtained. This film was cut into the size having the length of 5 mm and the width of 5 mm to form a sample. The weight of about 0.2 g of the sample was scaled, then this was immersed in 100 ml of tetrahydrofuran (made by Wako Pure Chemical Industries, Ltd, $1^{st}$ Grade) while introduced in the basket made of stainless steel of 80 mesh (the weight: B1), then it was taken out together with the basket after 48 hours at 23° C. After the solvent which was dripping was removed, the weight with the basket was immediately measured (the weight: B2).

This with the basket was left in the draft for 12 hours, and then the heat was applied for 2 hours at 105° C. Then, the weight with the basket was measured (the weight: B3), and the swelling degree in tetrahydrofuran was obtained from the below equation.

$$\text{The swelling degree in tetrahydrofuran (times)} = (B2-B1)/(B3-B1)$$

The Mechanical Stability 75 g of the latex wherein the solid concentration being regulated to 55% was set to Maron mechanical stability tester, then the pressure was applied for 5 minutes at the pressure (the gauge pressure) of the load 10 Kg/cm². The latex after the pressure applying was filtered with 80 mesh metal mesh (the weight: C1 (g)), then it was dried for 2 hours in the drier of 105° C. The weight (C2 (g)) of the metal mesh after the drying (the aggregation product adhered thereto) was measured, and the mechanical stability was obtained from the below equation. The smaller the value is, the higher the mechanical stability of the latex is.

$$\text{The mechanical stability (\%)} = [(C2-C1)/(75 \times 0.55)] \times 100$$

The Tensile Strength of the Dip Molded Article

The tensile strength of the dip molded article was measured based on ASTM D412. The film form dip molded article was punched out using dumbbell (the product name "Super dumbbell (Model: SDMK-100C) made by DUMB- BELL CO., LTD), thereby the sample for the tensile strength testing was produced. Said sample was pulled using Tensilon universal tester (the product name "RTG-1210" made by ORIENTEC Co., LTD) at the tensile speed of 500 mm/min, thereby the tensile strength (unit: MPa) right before the rupture and the elongation (unit: %) of right before the rupture were measured.

The Tear Strength of the Dip Molded Article

The tear strength of the dip molded article was measured based on ASTM D624-00.

The film form dip molded article having the film thickness of about 0.2 mm was left for 24 hours or longer in the constant-temperature and constant humidity chamber at 23° C. and the relative humidity of 50%, then it was punched out using dumbbell (Die C: made by DUMBBELL CO., LTD), thereby the sample for the tear strength testing was produced. Said sample was pulled using Tensilon universal tester (the product name "RTG-1210" made by A&D Company, Limited) at the tensile speed of 500 mm/min, thereby the tear strength (unit: N/mm) was measured.

The Amount of the Residual Metal

The amount of the residual metal in the latex (the total content of the aluminum atom and the titanium atom) was measured as described in below using the inductively coupled plasma-atomic emission spectrometry. 0.15 g of the latex was measured using the platinum crucible. This was applied with heat to remove the water, then 0.2 ml of sulfuric acid was added and then the heat was applied until the smoke was gone. This was incinerated by introducing in the electric furnace for 2 hours at 550° C., then 0.5 ml of the sulfuric acid and 5 ml of hyperpure water, and then further heated to dissolve. After adding 0.2 ml of nitric acid, it was added up to 20 ml by hyperpure water. This was set as the sample for the measurement.

Device: the product name "SPS-5100" (made by Hitachi High-Tech Science Corporation)

Standard curve: Internal standard curve method

The Amount of the Aggregation Product in the Composition for the Dip Molding (200 Mesh Filter)

The composition for the dip molding which the weight (the solid concentration: D wt %, the weight: E) was scaled in advance was filtered using metal mesh made of 200 mesh stainless metal mesh (the weight: C). This metal mesh was dried for 2 hours or more in the drier of 105° C., then the weight of the metal after the drying (the weight: F) was measured. Next, the amount (wt %) of the aggregation product in the composition for the dip molding was obtained from the below equation.

The amount of the aggregation product=$[(F-C)/(D \times E)] \times 10000$ (wt %)

The amount of 1,1,3,3-tetramethyl-1-butanol and the amount of cyclohexane

Using the below device and the column, the amount of 1,1,3,3-tetramethyl-1-butanol and the amount of cyclohexane were obtained by carrying out the gas chromatography analysis.

(The amount of 1,1,3,3-tetramethyl-1-butanol)

Device: the product name "GC-2010" (made by Shimadzu Corporation)

Column: the product name "ZB-1" (made by Shimadzu Corporation)

Detector: FID (The Amount of the Cyclohexane)

Device: the product name "GC" (made by PerkinElmer Co., Ltd)

Column: the product name "NEUTRA BOND-1" (made by GL Sciences Inc)

Detector: FID

The Production Example 1

(The Production of the Synthetic Isoprene Polymer Latex)

The synthetic isoprene polymer having the weight average molecular weight of 1,300,000 (the product name "NIPOL IR2200L", made by ZEON CORPORATION, homopolymer of isoprene, cis-bonding unit amount 98%) and cyclohexane were mixed, then the temperature was raised to 60° C. while stirring to dissolve, thereby the cyclohexane solution (a) of polyisoprene having the viscosity measured by B type viscosity of 12,000 mPa·s was prepared (the solid concentration of 8 wt %).

Meanwhile, 10 parts of sodium rosinate and 5 parts of sodium dodecylbenzene sulfonate were mixed with water, thereby the anionic surfactant solution (b) having the concentration of 1.5 wt % at the temperature of 60° C., comprising the mixture of sodium rosinate/sodium dodecylbenzene sulfonate=2/1 in terms of weight ratio was prepared.

Next, said cyclohexane solution (a) and said anionic surfactant solution (b) were mixed using the product name "Multi Line Mixer MS26-MMR-5.5 L" (made by SATAKE CHEMICAL EQUIPMENT MFG., LTD) so that the weight ratio was 1:1.5 (here, the solid portion ratio is polyisoprene:anionic surfactant=8:2.25), then using the product name "MILDER MDN310" (made by Pacific Machinery & Engineering Co., Ltd) the mixing and emulsifying were carried out at 4100 rpm and the emulsion (c) was obtained. Note that, here, the feed flow speed of the total of the cyclohexane solution (a) and the anionic surfactant (b) was 2,000 kg/hr, the temperature was 60° C., and the back pressure (the gauge pressure) was 0.5 MPa.

Next, the emulsion (c) was applied with heat of 80° C. at the reduced pressure of −0.01 to −0.09 MPa (the gauge pressure), and cyclohexane was removed, thereby the aqueous dispersion (d) of the synthetic isoprene polymer was obtained. Here, as the defoaming agent, the product name "SM5515" (made by Dow Corning Toray Co., Ltd) was used, it was continuously added by spraying so that the amount was 300 weight ppm with respect to synthetic isoprene polymer in the emulsion (c).

Note that, when removing cyclohexane, the emulsion (c) was regulated to be 70 volume % or less of the volume of the tank, and the stirring was done slowly at 60 rpm using the three step inclined paddle blade as the stirring blade.

Then, after removal of the obtained cyclohexane was completed, the obtained aqueous dispersion (d) was centrifuged at 4,000 to 5,000 G using the continuous centrifuge (the product name "SRG510" made by ALFA LAVAL), the synthetic isoprene polymer latex (e) having the solid concentration of 56 wt % as the light liquid was obtained. Note that, the condition of the centrifuge was, 10 wt % of the solid concentration of the aqueous dispersion (d) of before the centrifuge, 1300 kg/hr of the flow speed during the continuous centrifuge, and 1.5 MPa of the back pressure (gauge pressure) of the centrifuge.

The obtained synthetic isoprene polymer latex (e) had, the solid concentration of 56 wt %, the volume average particle diameter of 1.0 μm, pH=10, the viscosity measured by B type viscometer of 120·mPa·s, and the total content of the anionic surfactant of 3.0 parts per 100 parts of the synthetic isoprene polymer. Also, no aggregation product was observed in the latex (e), and the amount of the metal residue in the latex (e) (the total content of the aluminum atom and the titanium atom) was 250 weight ppm. The result is shown in Table 1.

The Production Example 2

The synthetic isoprene polymer latex (f) was obtained as same as the production example 1 except that the 5 parts of sodium dodecyl benzene sulfonate was changed to 15 parts of sodium dodecyl benzene sulfonate, and sodium rosinate was not used.

The obtained synthetic isoprene polymer latex (f) had 56 wt % of the solid concentration, 0.9 μm of the volume average particle diameter, pH=10, the viscosity measured by B type viscometer of 140 mPa·s, and the total content of the anionic surfactant of 3.3 parts per 100 parts of synthetic isoprene polymer. Also, no aggregation product was observed in the latex (f), and the amount of the metal residue in the latex (f) (the total content of the aluminum atom and the titanium atom) was 640 weight ppm. The result is shown in Table 1.

The Production Example 3

The synthetic isoprene polymer latex was obtained as same as the production example 1 except that the nonionic surfactant aqueous solution (o) having the concentration of 1.5 wt % of polyoxyethylenealkylether (the product name "EMULGEN 1150S-60" made by KAO CORPORATION) was used instead of the anionic surfactant aqueous solution (b) having the concentration of 1.5 wt % wherein the sodium rosinate and sodium dodecylbenzene sulfonate with water; however large amount of the aggregation product was generated in the latex, hence the synthetic isoprene polymer suitable for graft polymerizing the methacrylic acid could not obtained.

Example 1

To 100 parts of synthetic isoprene polymer of the synthetic isoprene polymer latex (e) obtained in the production example 1, 850 parts of distilled water was added to dilute. This diluted latex was introduced in the polymerization reaction container with the stirrer substituted with nitrogen, then the temperature was raised to 30° C. while stirring. Also, using other container, 5 parts of methacrylic acid and 16 parts of distilled water were mixed to prepare the methacrylic acid diluted solution. This methacrylic diluted solution was added taking 30 minutes to the polymerization reaction container which was been raised to 30° C.

Further, using other container, the solution (g) comprising 7 parts of distilled water, 0.32 parts of sodiumformaldehyde sulfoxylate (product name "SFS" made by MITSUBISHI GAS CHEMICAL COMPANY, INC), 0.01 parts of iron (I) sulfate (product name "flostFe" made by CHELSET CORPORATION) was prepared. Then, after this solution was added to the polymerization reaction container, 0.5 parts of 1,1,3,3-tetramethylbutylhydroperoxide (product name "PEROCTA H" made by NOF CORPORATION) was added, then the reaction was carried out for 1 hour at 30° C., then it was further reacted for 2 hours at 70° C. (the conversion rate of the graft polymerization was 99 wt %).

After the reaction, sodium hydroxide was added to regulate the pH to 10, then by using the continuous centrifuge (product name "SRG510" made by ALFA LAVAL), the centrifugation was carried out at 4,000 to 5,000 G (the flow speed was 1700 kg/hr, and the back pressure (the gauge pressure) of the centrifuge was 0.08 MPa). Thereby, the carboxyl-modified synthetic isoprene polymer latex (h) was obtained wherein the solid concentration of 56 wt %, the pH of 10, the viscosity measured by B type viscometer of 180 mPa·s, the volume average particle diameter of 1.0 μm, the total content of the anionic surfactant of 1.9 parts (with respect to 100 parts of carboxyl-modified synthetic isoprene polymer), the residual cyclohexane amount of 10 weight ppm, the residual amount of 1,1,3,3-tetramethyl-1-butanol (the boiling point: 145° C.) which is the decomposition product of 1,1,3,3-tetramethylbutylhydroperoxide of 119 weight ppm. The tetrahydrofuran-insoluble content of the carboxyl-modified synthetic isoprene polymer obtained by drying this carboxyl-modified synthetic isoprene polymer latex (h) was 88 wt %.

(The Composition for the Dip Molding)

First, using sodium hydroxide, the carboxyl group of styrene-maleic acid mono-sec-butylester-monomethylester maleate (the product name "Scripset 550" made by Hercules) was 100% neutralized using sodium hydroxide, thereby sodium salt aqueous solution (the concentration of 10 wt %) as the dispersing agent (i) was prepared. Then, this dispersing agent (i) was added to the carboxyl-modified synthetic isoprene polymer latex (h) so that it is 0.8 parts in terms of solid portion with respect to 100 parts of above mentioned carboxyl-modified synthetic isoprene polymer.

Further, while stirring the obtained mixture, the aqueous dispersions of each blending agent was added in terms of the solid portion so to satisfy 1.5 parts of zinc oxide, 1.5 parts of sulfur, 2 parts of antioxidant (the product name "Wingstay L" made by Goodyear Tire and Rubber Company), 0.3 parts of zinc diethylthiocarbamate, 0.5 parts of zinc dibutyldithiocarbamate, 0.7 parts of 2-mercaptobenzothiazol, with respect to 100 parts of carboxyl-modified synthetic isoprene polymer in the mixture, then potassium hydroxide solution was added thereby the composition (j) for the dip molding of which the pH was regulated to 10.5 was obtained.

Then, the composition (j) for the dip molding was aged in the thermostat chamber at 25° C. for 48 hours.

(The Dip Molded Article)

The glass mold (the diameter of 5 cm, and the length of ground part of about 15 cm) wherein the surface was ground processed was washed, then it was preheated in the oven of 70° C., then it was immersed in the coagulant aqueous solution comprising 18 wt % of calcium nitrate and 0.05 wt % of polyoxyethylenelaurylether (the product name "EMULGEN 109P" made by KAO CORPORATION) for 5 seconds, then it was taken out.

Next, the glass mold coated with the coagulant was dried in the oven of 70° C. Then, the glass mold coated with the coagulant was taken out from the oven, then it was immersed for 10 seconds at 25° C. in the composition for the dip molding and it was taken out. Then, it was dried for 60 minutes at room temperature and the glass mold coated by a film was obtained. Then, this glass mold coated with the film was immersed in the warm water of 60° C. for 2 minutes, and it was dried for 30 minutes by air. Then, this glass mold coated with the film was carried out with the vulcanization for 20 minutes in the oven of 120° C. The glass mold coated with the film which has been vulcanized was cooled to a room temperature, then talc was sprayed and said film was released from the glass mold. The tensile strength and the elongation of the obtained film (the dip molded article) are shown in Table 2.

Example 2

The carboxyl-modified synthetic isoprene polymer latex (k) was obtained as same as the example 1 except that the synthetic isoprene polymer latex (f) obtained in the production example 2 was used instead of the synthetic isoprene polymer latex (e) of the production example 1.

The obtained carboxyl-modified synthetic isoprene polymer latex (k) had the solid concentration of 56 wt %, the pH of 10, the viscosity measured by B type viscometer of 200 mPa·s, the volume average particle diameter of 0.9 μm, the total content of the anionic surfactant of 2.2 parts by weight (with respect to 100 parts by weight of carboxyl-modified synthetic isoprene polymer), the residual cyclohexane amount of 12 weight ppm, the residual amount of 1,1,3,3-tetramethyl-1-butanol (the boiling point: 145° C.) which is the decomposition product of 1,1,3,3-tetramethylbutylhydroperoxide of 119 weight ppm. The tetrahydrofuran-insoluble content of the carboxyl-modified synthetic isoprene polymer obtained by drying this carboxyl-modified synthetic isoprene polymer latex (k) was 84 wt %.

(The Composition for the Dip Molding and the Dip Molded Article)

The composition for the dip molding and the film (the dip molded article) was obtained as same as the example 1 except that the carboxyl-modified synthetic isoprene polymer latex (k) was used instead of the carboxyl-modified synthetic isoprene polymer latex (h). The tensile strength and the elongation of the obtained film (the dip molded article) are shown in Table 2.

Example 3

The carboxyl-modified synthetic isoprene polymer latex (m) was obtained as same as the example 1 except that the solution (l) was used comprising 1.4 parts of distilled water, 0.06 parts of sodiumformaldehyde sulfoxylate (product name "SFS" made by MITSUBISHI GAS CHEMICAL COMPANY, INC), 0.002 parts of iron (I) sulfate (product name "flostFe" made by CHELSET CORPORATION) instead of the solution (g) comprising 7 parts of distilled water, 0.32 parts of sodiumformaldehyde sulfoxylate (product name "SFS" made by MITSUBISHI GAS CHEMICAL COMPANY, INC), 0.01 parts of iron (I) sulfate (product name "flostFe" made by CHELSET CORPORATION); and 0.1 parts of 1,1,3,3-tetramethylbutylhydroperoxide (product name "PEROCTA H" made by NOF CORPORATION) was used instead of 0.5 parts of 1,1,3,3-tetramethylbutylhydroperoxide (product name "PEROCTA H" made by NOF CORPORATION).

The obtained carboxyl-modified synthetic isoprene polymer latex (m) had the solid concentration of 56 wt %, the pH of 10, the viscosity measured by B type viscometer of 160 mPa·s, the volume average particle diameter of 1.0 μm, the total content of the anionic surfactant of 2.0 parts (with respect to 100 parts of carboxyl-modified synthetic isoprene polymer), the residual cyclohexane amount of 10 weight ppm, the residual amount of 1,1,3,3-tetramethyl-1-butanol (the boiling point: 145° C.) which is the decomposition product of 1,1,3,3-tetramethylbutylhydroperoxide of 29 weight ppm. The tetrahydrofuran-insoluble content of the carboxyl-modified synthetic isoprene polymer obtained by drying this carboxyl-modified synthetic isoprene polymer latex (m) was 50 wt %.

(The Composition for the Dip Molding and the Dip Molded Article)

The composition for the dip molding and the film (the dip molded article) were obtained as same as the example 1 except that the carboxyl-modified synthetic isoprene polymer latex (m) was used instead of the carboxyl-modified synthetic isoprene polymer latex (h). The tensile strength and the elongation of the obtained film (the dip molded article) are shown in Table 2.

Example 4

The carboxyl-modified synthetic isoprene polymer latex (n) having 3.8 parts of total content of the anionic surfactant (with respect to 100 parts by weight of carboxyl-modified synthetic isoprene polymer) was obtained by adding 1.9 parts by weight of sodium dodecylbenzene sulfonate to the carboxyl-modified synthetic isoprene polymer latex (h) obtained in the example 1.

The composition for the dip molding and the film (the dip molded article) were obtained as same as the example 1 except that the carboxyl-modified synthetic isoprene polymer latex (n) was used instead of the carboxyl-modified synthetic isoprene polymer latex (h). The tensile strength and the elongation of the obtained film (the dip molded article) are shown in Table 2.

Example 5

The carboxyl-modified synthetic isoprene polymer latex (h) (the solid concentration of 56 wt %) was obtained as same as the example 1.

To this carboxyl-modified synthetic isoprene polymer latex (h), water having twice the volume of the latex was added in order to dilute, then using the rotary evaporator, it was condensed under the condition of the temperature of 80° C. and the reduced pressure of −0.0933 MPa, thereby the carboxyl-modified synthetic isoprene polymer latex (q) having the solid concentration of 56 wt % was again obtained. The obtained carboxyl-modified synthetic isoprene polymer latex (q) had the solid concentration of 56 wt %, the pH of 10, the viscosity measured by B type viscometer of 170 mPa·s, the volume average particle diameter of 1.0 μm, the total content of the anionic surfactant of 1.9 parts (with respect to 100 parts of carboxyl-modified synthetic isoprene polymer), the residual cyclohexane amount of 5 weight ppm, the residual amount of 1,1,3,3-tetramethyl-1-butanol (the boiling point: 145° C.) which is the decomposition product of 1,1,3,3-tetramethylbutylhydroperoxide of 26 weight ppm. The tetrahydrofuran-insoluble content of the polymer obtained by drying this carboxyl-modified synthetic isoprene polymer latex (q) was 90 wt %.

The composition for the dip molding and the film (the dip molded article) were obtained as same as the example 1 except that the carboxyl-modified synthetic isoprene polymer latex (q) was used instead of the carboxyl-modified synthetic isoprene polymer latex (h). The tensile strength and the elongation of the obtained film (the dip molded article) are shown in Table 2.

Comparative Example 1

The composition for the dip molding and the film (the dip molded article) were obtained as same as the example 1, except that the synthetic isoprene polymer latex (e) obtained in the production example 1 was used instead of the carboxyl-modified synthetic isoprene polymer latex (h) when preparing the composition for the dip molding. The results are shown in Table 2.

TABLE 1

|  |  | Production example 1 | Production example 2 | Production example 3 |
|---|---|---|---|---|
| Production of synthetic isoprene polymer | Concentration of cyclohexane solution of synthetic polyisoprene (wt %) | 8 | 8 | 8 |
|  | Used amount of sodium rosinate (parts) | 10 | 0 | 0 |
|  | Used amount of sodium dodecylbenzenesulfonate (parts) | 5 | 15 | 0 |
|  | Used amount of polyoxyethylenealkylether (parts) | 0 | 0 | 15 |
| Physical properties of synthetic isoprene polymer latex | Solid concentration (wt %) | 56 | 56 | Large amount of coagulated product was formed, thus physical properties were unable to measure |
|  | Volume average particle diameter (μm) | 1.0 | 0.9 |  |
|  | pH | 10 | 10 |  |
|  | Viscosity (mPa · s) | 120 | 140 |  |
|  | Remaining amount (parts) of surfactant with respect to 100 parts of polymer | 3.0 | 3.3 |  |
|  | Remaining amount (weight ppm) of metal in latex (total amount of Al and Ti) | 250 | 640 |  |

TABLE 2

|  |  | Example 1 | Example 2 | Example 3 | Example 4 | Example 5 | Comparative example 1 |
|---|---|---|---|---|---|---|---|
| Synthetic isoprene polymer latex | Production example of synthetic isoprene polymer latex | Production example 1 | Production example 2 | Production example 1 | Production example 1 | Production example 1 | Production example 1 |
| Carboxyl-modified synthetic isoprene polymer latex | Solid concentration (wt %) | 56 | 56 | 56 | 56 | 56 | no carboxyl modification |
|  | Volume average particle diameter (μm) | 1.0 | 0.9 | 1.0 | 1.0 | 1.0 |  |
|  | pH | 10 | 10 | 10 | 10 | 10 |  |
|  | Viscosity (mPa · s) | 180 | 200 | 160 | 420 | 170 |  |
|  | Remaining amount (parts) of surfactant with respect to 100 parts of polymer | 1.9 | 2.2 | 2.0 | 3.8 | 1.9 |  |
|  | Remaining amount (ppm) of 1,1,3,3-tetramethyl-1-butanol | 119 | 119 | 29 | 119 | 26 |  |
|  | tetrahydrofuran-insoluble content (wt %) | 88 | 84 | 50 | 86 | 90 |  |
| Composition for dip molding | Blending amount (parts) (carboxyl-modified) synthetic isoprene polymer | 100 | 100 | 100 | 100 | 100 | 100 |
|  | Blending amount (parts) of dispersing agent (Scripset550 (in a form of Na salt)) | 0.8 | 0.8 | 0.8 | 0.8 | 0.8 | 0.8 |
|  | Blending amount of zinc oxide (parts) | 1.5 | 1.5 | 1.5 | 1.5 | 1.5 | 1.5 |
|  | Blending amount of sulfur (parts) | 1.5 | 1.5 | 1.5 | 1.5 | 1.5 | 1.5 |
|  | Blending amount of antioxidant ("Wingstay L") (parts) | 2 | 2 | 2 | 2 | 2 | 2 |
|  | Blending amount of zinc diethylthiocarbamate (parts) | 0.3 | 0.3 | 0.3 | 0.3 | 0.3 | 0.3 |
|  | Blending amount of zinc dibutylthiocarbamate (parts) | 0.5 | 0.5 | 0.5 | 0.5 | 0.5 | 0.5 |
|  | Blending amount of 2-marcaptobenzothiazole zinc salt | 0.7 | 0.7 | 0.7 | 0.7 | 0.7 | 0.7 |
|  | pH of composition for dip molding | 10.5 | 10.5 | 10.5 | 10.5 | 10.5 | 10.5 |
|  | Aggregated product (200 mesh filter) (wt %) | 0.01 | 0.22 | 0.01 | 0.00 | 0.00 | 0.00 |
| Dip molded article | Tensile strength (Mpa) | 35 | 30 | 27 | 23 | 35 | 16 |
|  | Elongation (%) | 900 | 900 | 900 | 950 | 900 | 950 |

According to Table 2, the dip molded article obtained by using the carboxyl-modified synthetic isoprene polymer latex which satisfies the requirements of the present invention had excellent tensile strength and it was able to be used as groves which hardly breaks (the examples 1 to 5).

On the other hand, for the comparative example 1 which does not satisfy the requirements of the present invention as it does not graft polymerize the methacrylic acid in the aqueous phase (no carboxyl-modification), it showed poor tensile strength of the dip molded article (the comparative example 1).

Note that, in case the anionic surfactant was not used and nonionic surfactant was only used for the production of the synthetic isoprene polymer, then large amount of the aggregation products were generated (the production example 3), hence it was not suitable for the production of the carboxyl-modified synthetic isoprene polymer latex wherein the methacrylic acid was graft polymerized.

Also, in case the deodorizing step (alcohol removing step) was further carried out after the condensation treatment of carboxyl-modified synthetic isoprene polymer latex which is after the graft polymerization using the centrifuge, the residual amount of 1,1,3,3-tetramethyl-1-butanol was little, and had excellent tensile strength, further the odor problem was solved (the example 5).

Example 6

The carboxyl-modified synthetic isoprene polymer latex (h) was obtained as same as the example 1. For this carboxyl-modified synthetic isoprene polymer latex (h), the evaluations of the tetrahydrofuran-insoluble content, the swelling degree in tetrahydrofuran, and the mechanical stability were carried out. The results are shown in Table 3.

Also, as same as the example 1, the film (the dip molded article) was obtained, and the tensile strength, elongation and the tear strength were measured, the results are shown in Table 3.

Example 7

The carboxyl-modified synthetic isoprene polymer latex (r) was obtained as same as the example 1 except that 10 parts of methacrylic acid was used instead of 5 parts of methacrylic acid. For this carboxyl-modified synthetic isoprene polymer latex (r), the evaluations of the tetrahydrofuran-insoluble content, the swelling degree in tetrahydrofuran, and the mechanical stability were carried out. The results are shown in Table 3.

Also, except for using carboxyl-modified synthetic isoprene polymer latex (r) instead of the carboxyl-modified synthetic isoprene polymer latex (h), the film (the dip molded article) was obtained as same as the example 1, and the tensile strength, elongation and the tear strength were measured. The results are shown in Table 3.

Example 8

The carboxyl-modified synthetic isoprene polymer latex (s) was obtained as same as the example 1 except that 30 parts of methacrylic acid was used instead of 5 parts of methacrylic acid. For this carboxyl-modified synthetic isoprene polymer latex (s), the evaluations of the tetrahydrofuran-insoluble content, the swelling degree of tetrahydrofuran, and the mechanical stability were carried out. The results are shown in Table 3.

Also, except for using carboxyl-modified synthetic isoprene polymer latex (s) instead of the carboxyl-modified synthetic isoprene polymer latex (h), the film (the dip molded article) was obtained as same as the example 1, and the tensile strength, elongation and the tear strength were measured. The results are shown in Table 3.

Comparative Example 2

The mechanical stability was evaluated using the synthetic isoprene polymer latex (e) obtained in example 1 instead of the carboxyl-modified synthetic isoprene polymer latex (h). The result is shown in Table 3.

Also, except for using synthetic isoprene polymer latex (e) obtained in the production example 1 instead of the carboxyl-modified synthetic isoprene polymer latex (h), the film (the dip molded article) was obtained as same as the example 1, and the tensile strength, elongation and the tear strength were measured, the results are shown in Table 3.

TABLE 3

|  |  | Example 6 | Example 7 | Example 8 | Comparative example 2 |
| --- | --- | --- | --- | --- | --- |
| Synthetic isoprene polymer latex | Production example of synthetic isoprene polymer latex | Production example 1 | Production example 1 | Production example 1 | Production example 1 |
| Carboxyl modification reaction (graft polymerization) | Synthetic isoprene polymer (parts) | 100 | 100 | 100 | No carboxyl modification |
|  | Methacrylic acid (parts) | 5 | 10 | 30 |  |
|  | Graft polymerization conversion rate (%) | 99 | 99 | 99 |  |
| Carboxyl-modified synthetic isoprene polymer latex (comparative example did not have carboxyl modification) | Tetrahydrofuran-insoluble content (wt %) | 88 | 93 | 97 | 1.8 |
|  | Swelling degree in tetrahydrofuran (times) | 17 | 8 | 3 | 83 |
|  | Mechanical stability (amount of aggregation product) | 0.015 | 0.008 | 0.005 | 0.497 |
| Composition for dip molding | Blending amount (parts) (carboxyl-modified) synthetic isoprene polymer | 100 | 100 | 100 | 100 |
|  | Blending amount (parts) of dispersing agent (Scripset550 (in a form of Na salt)) | 0.8 | 0.8 | 0.8 | 0.8 |
|  | Blending amount of zinc oxide (parts) | 1.5 | 1.5 | 1.5 | 1.5 |
|  | Blending amount of sulfur (parts) | 1.5 | 1.5 | 1.5 | 1.5 |
|  | Blending amount of antioxidant ("Wingstay L") (parts) | 2 | 2 | 2 | 2 |
|  | Blending amount of zinc diethylthiocarbamate (parts) | 0.3 | 0.3 | 0.3 | 0.3 |
|  | Blending amount of zinc dibutylthiocarbamate (parts) | 0.5 | 0.5 | 0.5 | 0.5 |
|  | Blending amount of 2-marcaptobenzothiazole zinc salt | 0.7 | 0.7 | 0.7 | 0.7 |
|  | pH of composition for dip molding | 10.5 | 10.5 | 10.5 | 10.5 |
| Dip molded article | Tensile strength (Mpa) | 35 | 37 | 38 | 16 |
|  | Elongation (%) | 900 | 900 | 900 | 950 |
|  | Tear strength (N/mm) | 50 | 60 | 65 | 15 |

According to Table 3, the carboxyl-modified synthetic isoprene polymer latex for dip molding wherein the carboxyl-modified synthetic isoprene polymer latex comprises at least one anionic surfactant, and a carboxyl-modified synthetic isoprene polymer consisting the carboxyl-modified synthetic isoprene latex have a tetrahydrofuran-insoluble content of 30 wt % or more and a swelling degree in tetrahydrofuran of 30 times or less, has excellent mechanical stability (the amount of the aggregation product is small); and the dip molded article obtained by using said latex not only has excellent tensile strength but also has excellent tear strength, thus it was particularly preferable to be used as gloves (the examples 6 to 8).

On the other hand, the comparative example 2 which does not satisfy the requirements of the present invention as it is not carboxyl-modified, it showed poor mechanical stability (large amount of the aggregation product), and the obtained dip molded article not only had poor tensile strength but also had poor tear strength (the comparative example 2).

The invention claimed is:

1. A carboxyl-modified synthetic isoprene polymer latex for dip molding obtained by graft polymerizing a monomer comprising a carboxyl group onto a synthetic isoprene polymer in an aqueous phase, wherein
   the carboxyl-modified synthetic isoprene polymer latex comprises at least one anionic surfactant, and
   a carboxyl-modified synthetic isoprene polymer composing the carboxyl-modified synthetic isoprene latex has a tetrahydrofuran-insoluble content of 30 wt % or more.

2. The carboxyl-modified synthetic isoprene polymer latex for dip molding as set forth in claim 1, wherein said anionic surfactant comprises a fatty acid salt, and at least one selected from the group consisting of alkyl benzene sulfonate, alkyl sulfosuccinate, alkyl sulfate and polyoxyethylenealkylether sulfate.

3. The carboxyl-modified synthetic isoprene polymer latex for dip molding as set forth in claim 1, wherein said anionic surfactant comprises alkylbenzene sulfonate, and a fatty acid.

4. The carboxyl-modified synthetic isoprene polymer latex for dip molding as set forth in claim 1, wherein a total content of said anionic surfactant is 0.1 to 3 parts by weight with respect to 100 parts by weight of said carboxyl-modified synthetic isoprene polymer.

5. The carboxyl-modified synthetic isoprene polymer latex for dip molding as set forth in claim 1, wherein the carboxyl-modified synthetic isoprene polymer have the tetrahydrofuran-insoluble content of 60 wt % or more.

6. The carboxyl-modified synthetic isoprene polymer latex for dip molding as set forth in claim 1, comprising 0.1 to 100 weight ppm of alcohol.

7. A carboxyl-modified synthetic isoprene polymer latex for dip molding, wherein
said carboxyl-modified synthetic isoprene polymer latex comprises at least one anionic surfactant,
a carboxyl-modified synthetic polymer comprising the carboxyl-modified synthetic isoprene polymer latex have a tetrahydrofuran-insoluble content of 30 wt % or more, and a swelling degree in tetrahydrofuran of 30 times or less.

8. A composition for a dip molding comprising the carboxyl-modified synthetic isoprene polymer latex for dip molding as set forth in claim 1, sulfur based vulcanizing agent and a vulcanization accelerator.

9. A dip molded article formed by dip molding the composition for the dip molding as set forth in claim 8.

10. The dip molded article as set forth in claim 9, wherein a tear strength measured by ASTM D624-00 (Die C, 500 mm/min) is 30 N/mm or more.

11. The dip molded article as set forth in claim 9 which is a glove.

* * * * *